United States Patent [19]

Ito

[11] Patent Number: 5,155,345
[45] Date of Patent: Oct. 13, 1992

[54] DATA READ DEVICE
[75] Inventor: Naoki Ito, Shizuoka, Japan
[73] Assignee: Tokyo Electric Co., Ltd., Tokyo, Japan
[21] Appl. No.: 507,046
[22] Filed: Apr. 9, 1990
[30] Foreign Application Priority Data
  Apr. 13, 1989 [JP] Japan .................. 1-94224
[51] Int. Cl.⁵ .............................................. G06K 7/10
[52] U.S. Cl. .................................. 235/462; 235/383; 235/466
[58] Field of Search ............... 235/383, 455, 457, 462, 235/463, 466

[56]  References Cited
  U.S. PATENT DOCUMENTS
  4,431,912  2/1984  Dickson et al. ............... 235/466

FOREIGN PATENT DOCUMENTS
  0200882 12/1986 European Pat. Off. .
  0283241  9/1988 European Pat. Off. .
  60-31679  2/1985 Japan .
  WO87/07416 12/1987 World Int. Prop. O. .

OTHER PUBLICATIONS
  Patent Abstracts of Japan, vol. 10, No. 53 (P-433) [2110], Mar. 4, 1986; & JP-A-60 198 691 (Nippon Denki K.K.) Aug. 10, 1985.

Primary Examiner—Harold Pitts
Attorney, Agent, or Firm—Frishauf, Holtz, Goodman & Woodward

[57]  ABSTRACT

A data read device includes a read window, and a read section for optically reading a bar code on an article passing across a limited space in front of the window, and for generating output data corresponding to the bar code. The read device further includes a processing circuit for detecting that the article has passed across the limited space, from one side of the window to the other, and cancelling the output data generated from the read section, upon detection of this movement.

16 Claims, 12 Drawing Sheets

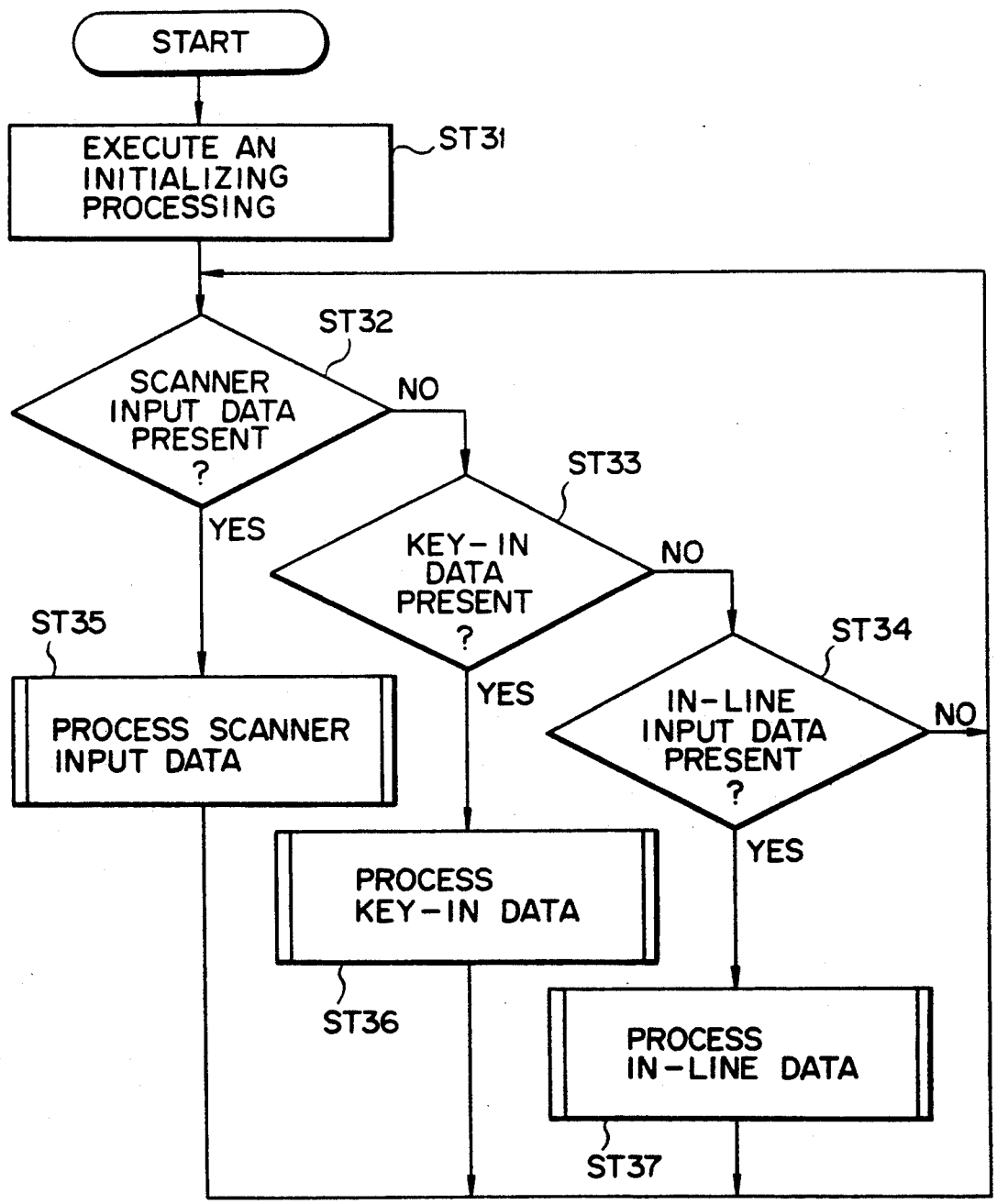
F I G. 7

DATA READ DEVICE

BACKGROUND OF THE INVENTION

1. Field of the Invention

The present invention relates to a data processing system, and more particularly to a data read device for optically reading symbols, such as bar codes on articles.

2. Description of the Related Art

A settlement system as shown in FIG. 1 is known, and includes a scanner SN for optically reading a bar code on an article, and an electronic cash register RG for processing bar code data supplied from the scanner SN. The register RG is used as a POS (point of sales), for example.

For the purpose of payment, a customer places a basket 1 containing articles on a check stand 2A, a cashier removes the articles one by one from the basket 1, and reads the bar codes on the articles by passing them across the scanner SN. Thereafter, the cashier places the scanned articles in a basket 4 situated on another check table 2B. Specifically, the scanner SN reads the bar code on an article when the article is moved across a window 3 in the direction of arrow A, and supplies the bar code data corresponding to the read bar code to the cash register RG, which produces sales data in accordance with items of the bar code data.

Consider the case where a bar code is partly illegible due to blurring, for example, and the scanner SN fails to read all of the bar code. In this case, an attempt is made to read the bar code again, and to this end, the cashier moves the article in the direction of arrow B and returns it to the basket 1 side, and again passes it in front of the window 3, in the direction of arrow A. In the conventional settlement system, there is a possibility that the bar code on an article read twice or more during the movement of the article. If items of identical bar code data are supplied from the scanner SN, the cash register RG processes these bar code data and produce erroneous sales data as a result of the processing. To correct this sales data, intricate procedures are required.

SUMMARY OF THE INVENTION

Accordingly, an object of the present invention is to provide a data read device which can suppress the malfunctions in reading of symbols on articles.

To achieve the above object, there is provided a data read device comprising: a read window; a read section for optically reading a symbol on an article passing across a limited space in front of the window, and for generating output data corresponding to the symbol; and a processing section for detecting that the article has passed across the limited space from one side of the window to the other, and canceling the output signal generated from the read section upon detection of this movement.

When the read section fails to read the symbol on the article passing across the limited space, the article is then passed across the limited space again in another attempt to read the symbol. During the return of the article, the read section may read the bar code on the article and generate output data corresponding to the bar code. However, the processing section cancels this output data by detecting the moving direction of the article. Therefore, it is possible to suppress the data reading device from generating items of identical output data for an article. In this respect, the data read device is improved in reliability.

BRIEF DESCRIPTION OF THE DRAWINGS

FIGS. 7 and 8 are flowcharts showing operations performed by the cash register shown in FIG. 4;

FIGS. 9A and 9B being flowcharts showing a scanner operation different from that of the first embodiment, and FIG. 10 showing a cash register operation different from that of the first embodiment is shown.

DETAILED DESCRIPTION OF THE PREFERRED EMBODIMENT

Figure 1:
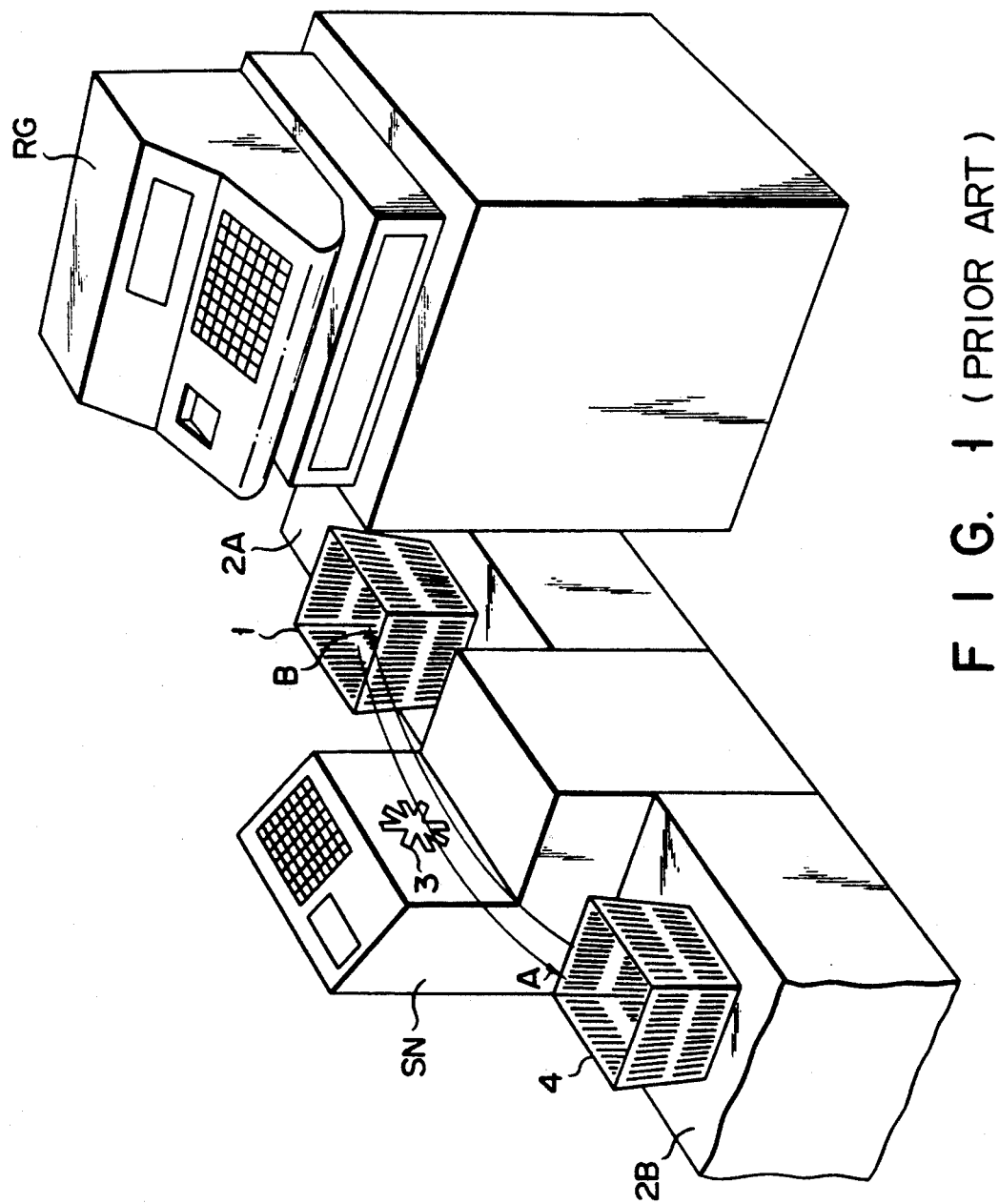
FIG. 1 shows a conventional settlement system.

A settlement system according to a first embodiment of the present invention will now be described, with reference to FIGS. 2 through 8.

The system of this embodiment includes a scanner 11 for reading a bar code on an article and generating a corresponding bar code data, and an electronic cash register 15 for processing the bar code data supplied from the scanner 11 and producing sales data as a result of the processing. The cash register 15 serves as a POS terminal.

As shown, the scanner 11 is located between check tables 10A and 10B. The scanner is provided with a read window 12 for transmitting a laser beam which is emitted into a limited space in front of the window 12 and reflected by a bar code on an article passing across the limited space, and a pair of optical sensors, 13 and 14, disposed one on either side of the read window 12. The optical sensor 13 is closer to the check table 10A than to the check table 10B, while the optical sensor 14 is closer to the check table 10B than to the check table 10A. The sensor 13 is made up of a light emitting element 13A and a photo detecting element 13B. The light emitting element 13A is located in the upper portion of a vertical board 11A having the read window 21, and emits infrared rays downwardly toward the photo detecting element 14A. The sensor 14 is likewise made up of a light emitting element 14A and a photo detecting element 14B. The light emitting element 14A is located in the upper portion of a vertical board 11B, and emits infrared rays downwardly toward the photo detecting element 14B. When an article (including the hand grasping it) passes across the sensors 13 and 14, the infrared rays emitted from the light emitting elements 13A and 14A are shut off. Accordingly, the output signals of the photo detecting elements 13B and 14B, which receives the rays from the light emitting elements 13A and 14A, change their logical level from "H" to "L".

A keyboard 16, a display window 17, and a receipt outlet 18 are installed on the front panel of a frame of the cash register 15, with a drawer 19 being installed in the lower part thereof. In addition, a printer 20 is installed within the frame and near to the receipt outlet 18.

Figure 3:
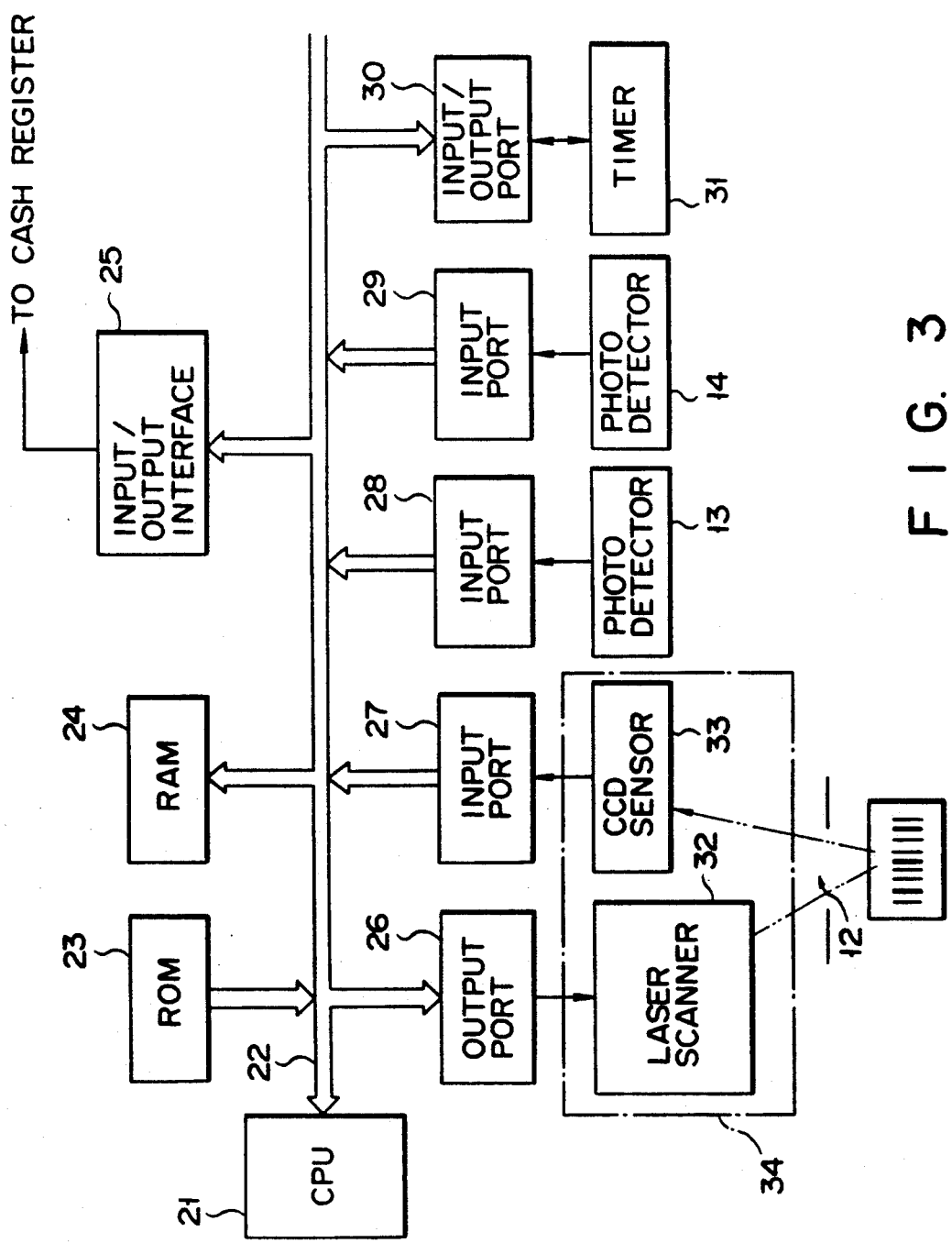
FIG. 3 is a circuit diagram of a scanner shown in FIG. 2.

FIG. 3 is a block diagram of the scanner 11. The scanner 11 further includes a ROM 23, RAM 24, input-/output interface 25, output port 26, input ports 27, 28 and 29, and an input/output port 30. These elements are interconnected by bus lines 22 including of an address bus, a data bus, and a control bus.

The input/output interface 25 is connected through a transmission line to the electronic cash register 15, the input port 28 is connected to the optical sensor 13 for receiving an output signal of the photo detecting element 13B, the input port 29 is connected to the optical sensor 14 for receiving an output signal of the photo detecting element 14B, the input/output port 30 is connected to a timer 31.

The output port 26 is connected to a laser scanner 32 for scanning the bar code on an article by means of a laser beam emitted through the read window 12, the input port 27 is connected to a CCD sensor 33, which receives the laser beam reflected by the bar code and converts the resulting bar code image into bar code data, and the laser scanner 32, in combination with the CCD sensor 33, forms a read section, or an image reader, for optically reading the bar code.

Figure 2:
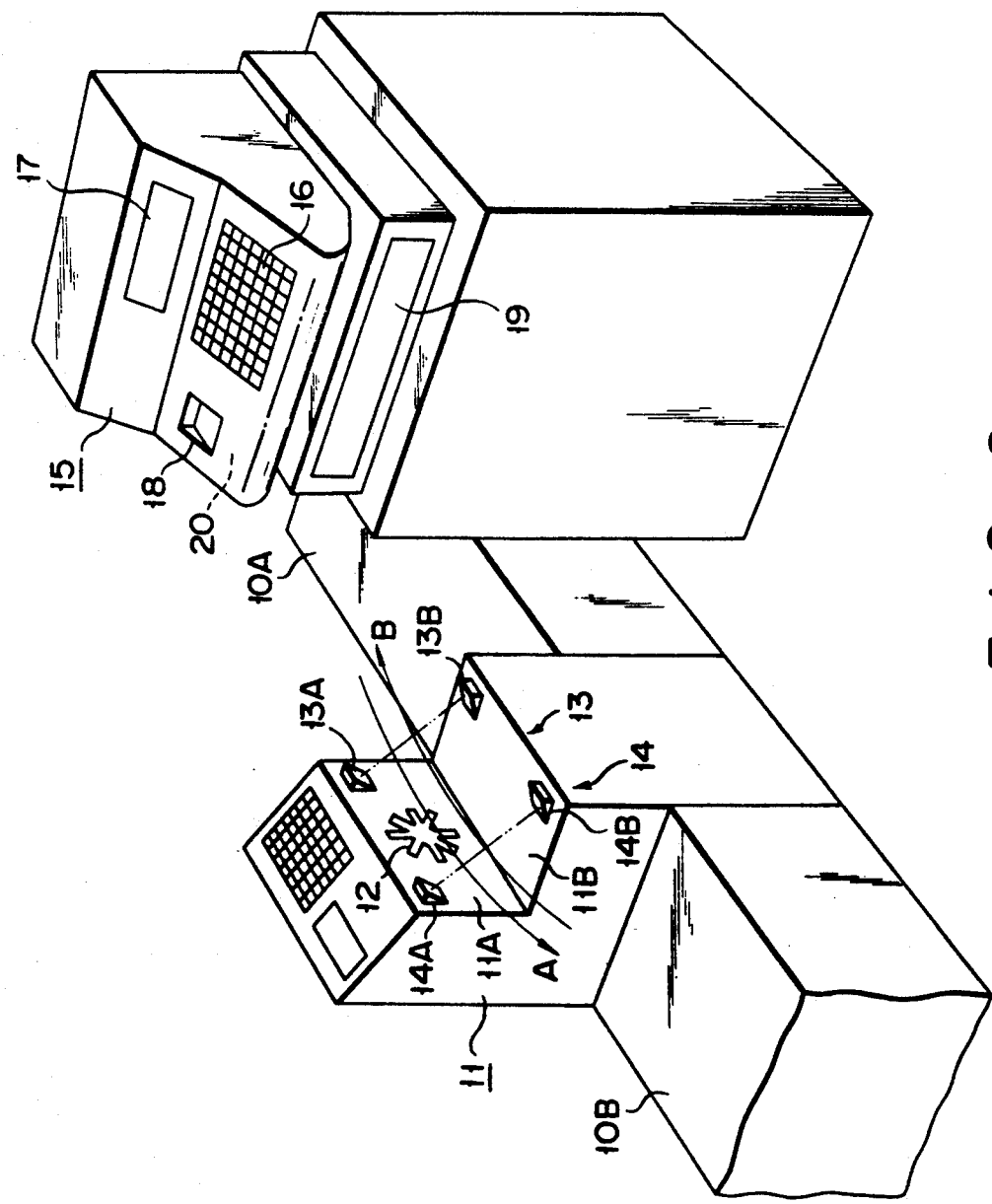
FIG. 2 shows a settlement system according to an embodiment of the present invention.

The ROM 23 stores a control program for checking which of sensors 13 and 14 has detected the passage of an article before the reader 34 reads the bar code, in order to determine the direction of movement of the article, and to transfer the bar code data read by the reader 34 to the cash register 15 only when the direction of passage of the article is coincident with a predetermined direction (in this instance, the direction of arrow A in FIG. 2). A CPU 21 progressively executes the program while reading it out from the ROM 23.

Figure 4:
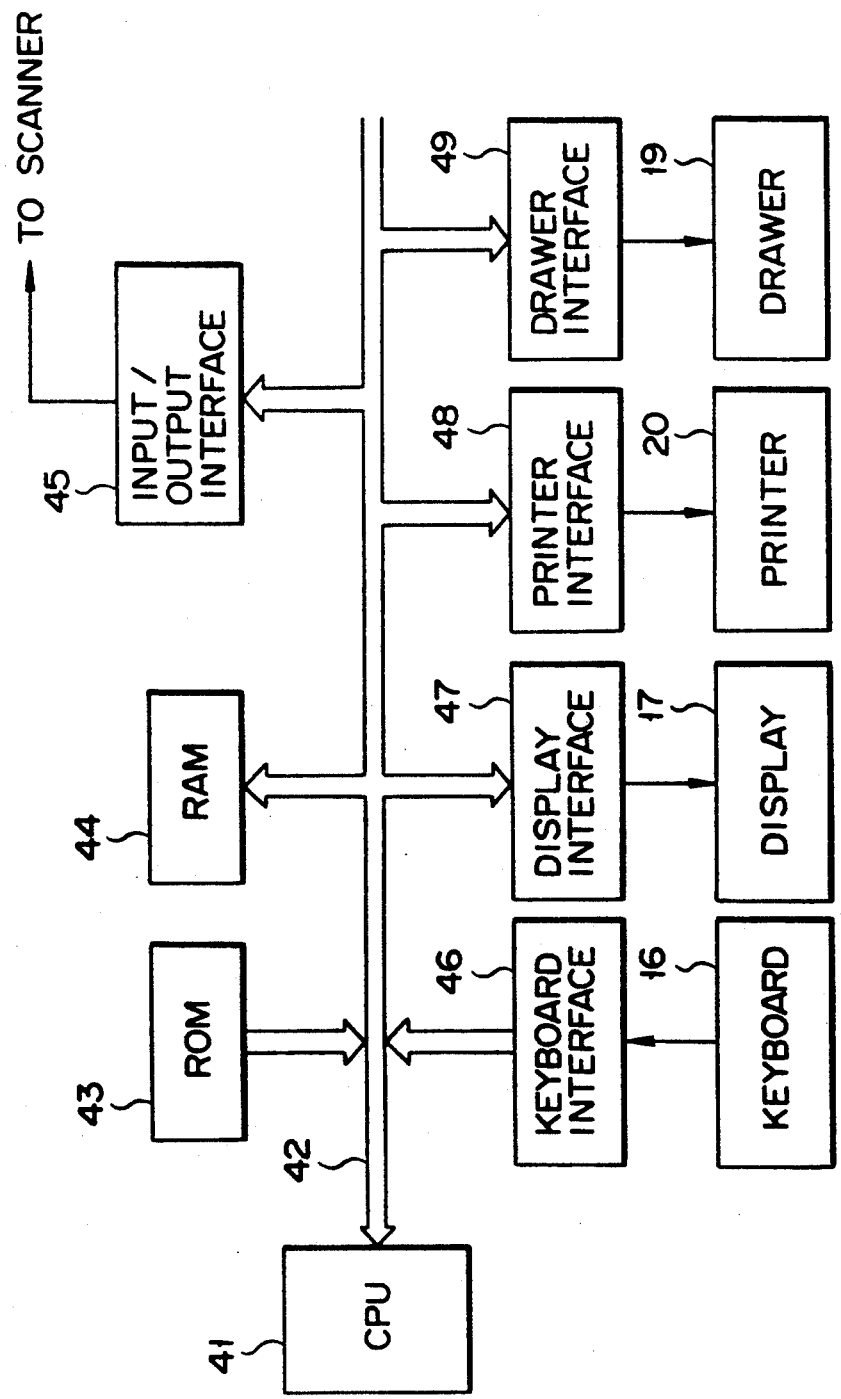
FIG. 4 is a circuit diagram of an electronic cash register shown in FIG. 2.
Figure 5:
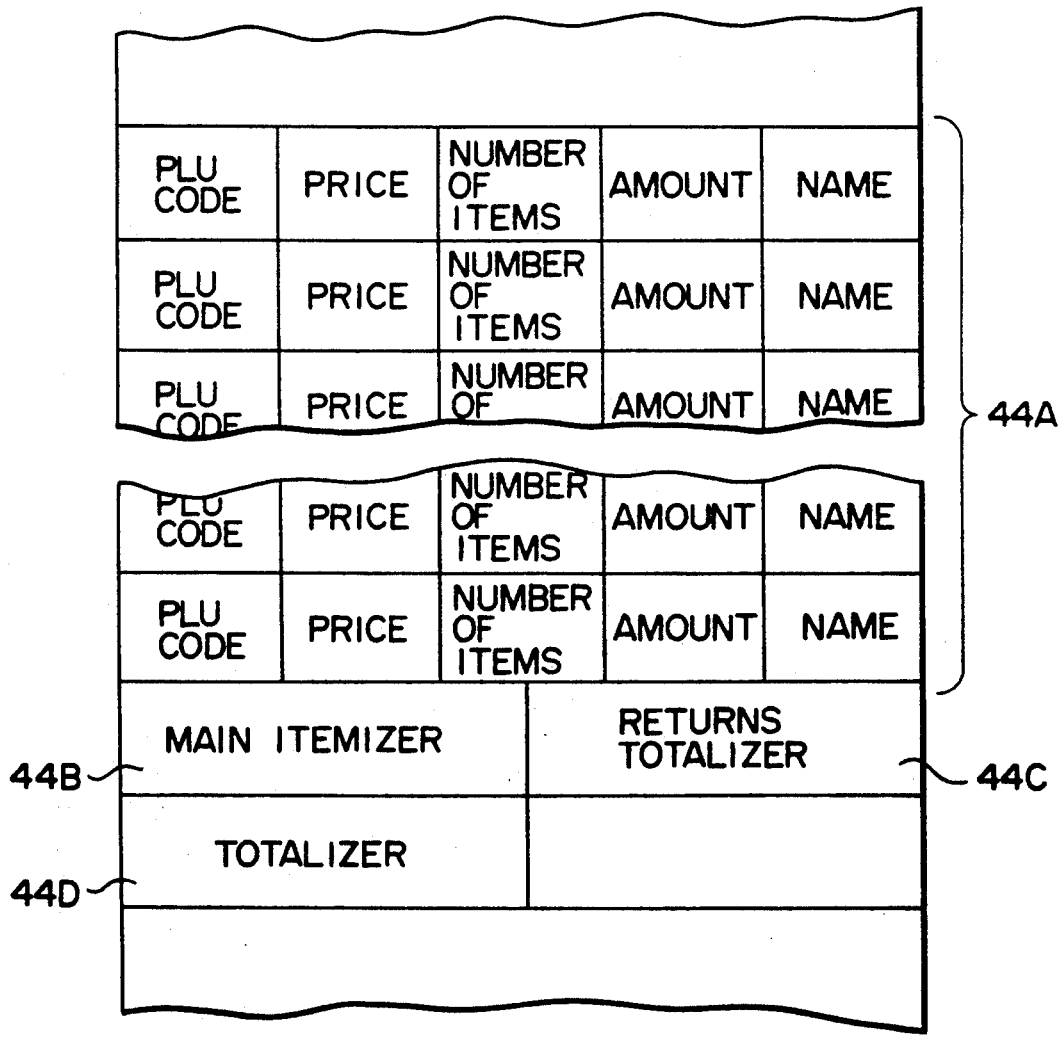
FIG. 5 is a diagram of a plurality of registers contained in a RAM shown in FIG. 4.

FIG. 4 shows a block diagram of the electronic cash register 15. The register 15 is made up of a CPU 41, a ROM 43, a RAM 44, an input/output interface 45, a keyboard interface 46, a display interface 47, a printer interface 48, and a drawer interface 49. These elements are interconnected by a bus line including an address data bus and a control bus.

The RAM 44 contains a number of memory areas i.e., a PLU file 44A, a main itemizer 44B, a returns totalizer 44C, and a sales totalizer 44D. The PLU file 44A includes items of article data and PLU codes assigned to the article data items. Each article data is constituted by the name, unit price, sold unit number, and sales amount of a corresponding article.

The scanner 11 is connected to the input/output interface 45, the keyboard 16 is connected to the keyboard Interface 46, the display 17 is connected to the display interface 47, the printer 20 is connected to the printer interface 48, and the drawer 19 is connected to the drawer interface 49.

Figure 8:
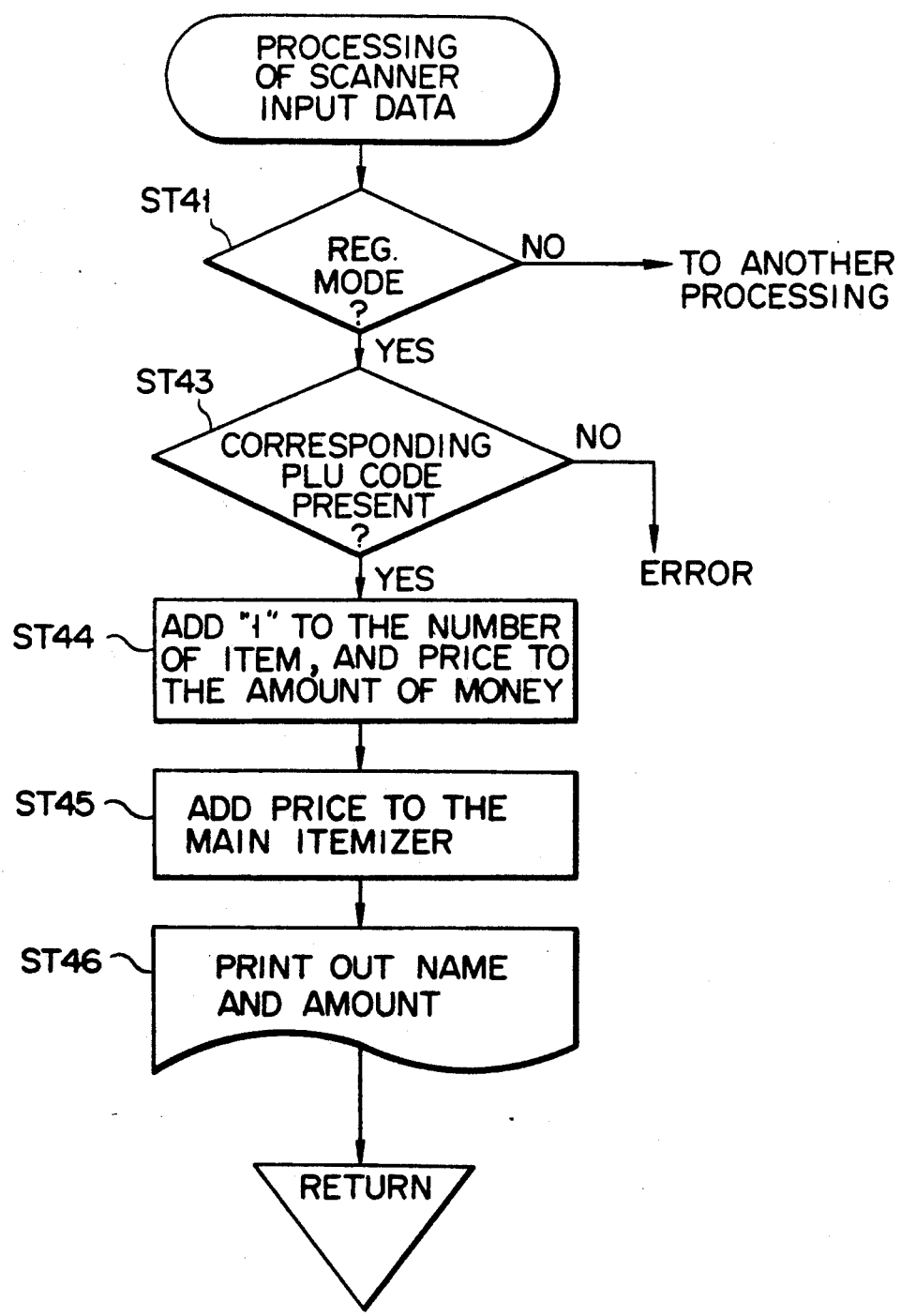

An operation of the settlement system will be described with reference to FIGS. 6 through 8.

Figure 6:
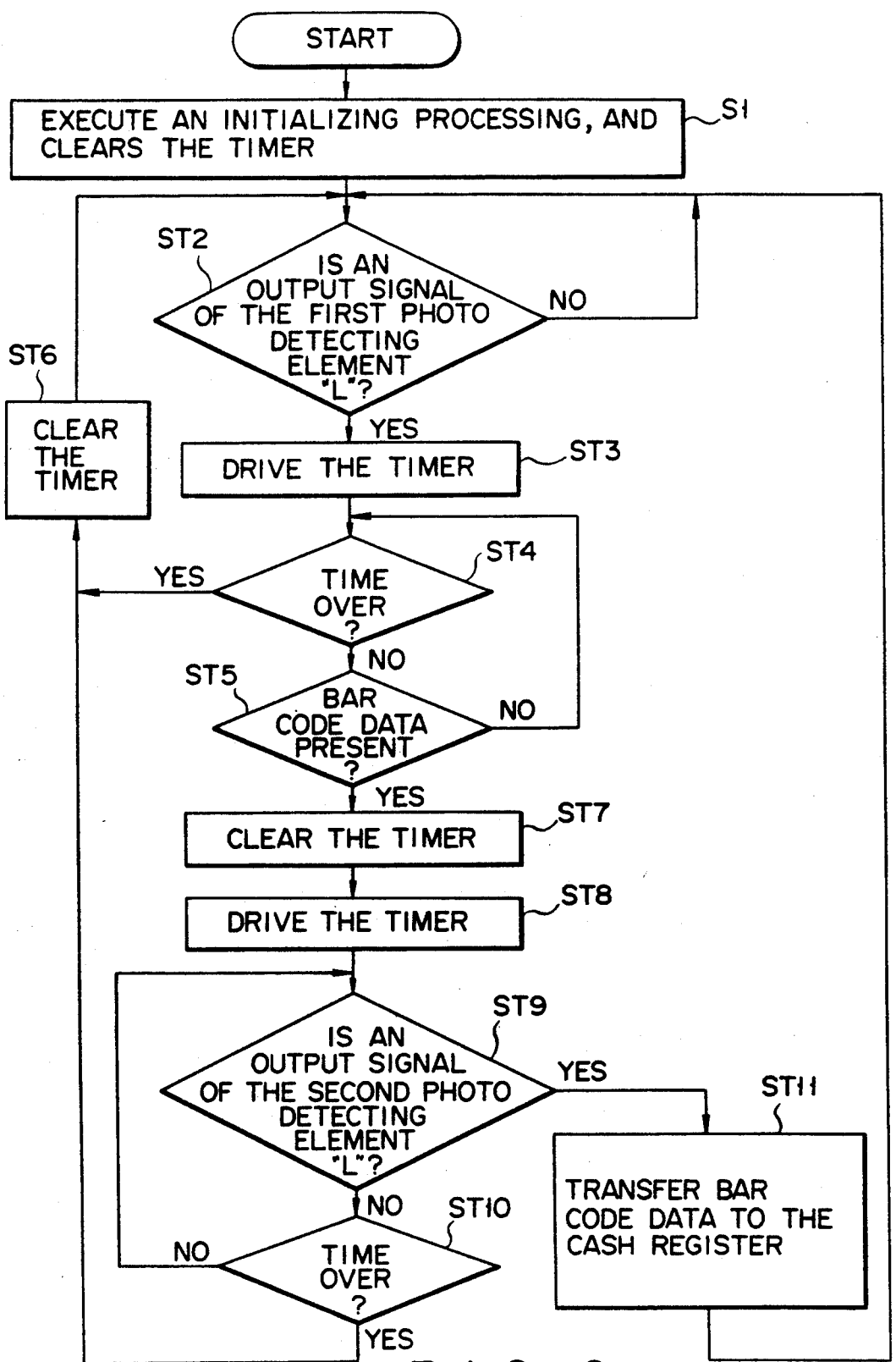
FIG. 6 is a flowchart showing the operation of the scanner shown in FIG. 3.

Upon power-on, the scanner 11—more exactly the CPU 21—, executes the process of reading a bar code in accordance with the control flow shown in FIG. 6. In step ST1, the CPU 21 executes an initializing process, and clears the timer 31. In step ST2, the CPU checks if the first photo detecting element 13B is at logical level "L" at the output. In other words, the CPU checks if an article (including the hand grasping it) has passed across the first sensor 13. If the answer is NO, that is, no article has yet passed across the sensor 13, the CPU repeats the process of step ST2, to monitor the passage of an article thereacross.

If the answer is YES, that is, an article has passed across the sensor 13, the CPU advances to step ST3, to start the timer 31. Subsequently, in step ST4, the timer 31 is checked to confirm that a preset time has not elapsed from the activation. When it is confirmed, the CPU 21 advances to step ST5 and checks if the CCD sensor 33 contains bar code data. If the answer is NO, the CPU executes the steps ST4 and ST5 again. If, during the execution of these steps, it is detected that the preset time has elapsed, the CPU goes to step ST6, where it clears the timer 31, and then returns to step ST2. In a case where the CCD sensor 33 fails to read the bar code within the preset time, the CPU returns again to step ST2.

When the CCD sensor 33 reads the bar code data within the preset time, the CPU goes to step ST7, and clears the timer 31. Succeedingly, the CPU advances to step ST8. In this step, the CPU drives the timer 31, and in step ST9, it checks if the second photo detecting element 14B is at logical level "L". In other words, it checks if an article has passed across the sensor 14. If no article has yet passed across the sensor 14, the timer 31 is checked in step ST10. The process of steps ST9 and ST10 are repeated within the preset time. If it is detected that the preset time has elapsed, the CPU clears the timer 31 and execute step ST2 again. The CCD sensor 33 reads the bar code on an article and generates bar code data representative of the bar code after the article has passed across the first sensor 13. However, if the article does not pass across the second sensor 14 within another preset time after the bar code data has been generated, this bar code data is not transferred to the cash register 15.

When the article passes across the second sensor 14 within the preset time, the CPU goes to step ST11, where it transfers the bar code data to the cash register 15, and then the CPU returns to step ST2. In other words, only when the article moves at a higher than a predetermined speed in the direction of arrow A in FIG. 2, is the bar code data transferred to the cash register 15.

Meanwhile, the cash register 15, upon power-on, processes the bar code data to produce sales data in a control flow shown in FIG. 7. In step ST31, the cash register 15—more exactly, the CPU 41—executes an initial process, and in steps ST32 to ST34, the CPU 41 checks if a scanner input data signal, a key-in input data signal, and an in-line input data signal are successively present or not in this order. Then, in steps ST35 to ST37, the CPU 41 executes the processes on the basis of the results of the check, respectively.

If in step ST32, the scanner input signal is present, the CPU 41 moves to step ST35 and executes the processing of the scanner input data. The details of the scanner input data processing will now be described, with reference to FIG. 8. In step ST41 in FIG. 8, the CPU 41 checks if a registration mode has been set up by a key operation. If the registration mode has not been set up, the CPU to a step for performing another process. If the registration mode has been set up, the CPU moves to step ST43, and looks up the PLU file 44A, and checks if the PLU code corresponding to the bar code data derived from the scanner 11, is contained therein. If there is no corresponding code, that is, if the answer is NO, the CPU executes an error process.

If the answer is YES, i.e. there is a corresponding PLU code, the CPU executes steps ST44 to ST46. In step ST44, the CPU adds "1" to the sold unit number contained in the article data selected by the PLU code, and adds the unit price to the sales amount contained in the article data. In step ST45, the CPU adds the unit price to the contents of the main itemizer 44B. In step ST46, the CPU drives the printer 20 to print out the article name and the sales amount included in the article data. Thereafter, the CPU returns to step ST32 (FIG. 7).

As described above, the bar code data derived from the CCD sensor 33 is transferred to the cash register 15 only when the sensor 33 reads the bar code on an article within the preset time after the article has passed across the first sensor 13, and passed across the second sensor 14 within another preset time. In a case where the CCD sensor 33 fails to read a bar code, and to read the bar code again, an article is moved in front of the read window 12, and returned to the original position, only the bar code data that is obtained during the movement of the article in the direction of arrow A in FIG. 2, is transferred to the electronic cash register 15. It is prevented, therefore, that the bar code data of an article is mistakenly registered two times. With this feature, there is no need for the procedural step to delete the additionally registered bar code data. In this respect, an operability of the settlement system is improved.

Figure 9A:
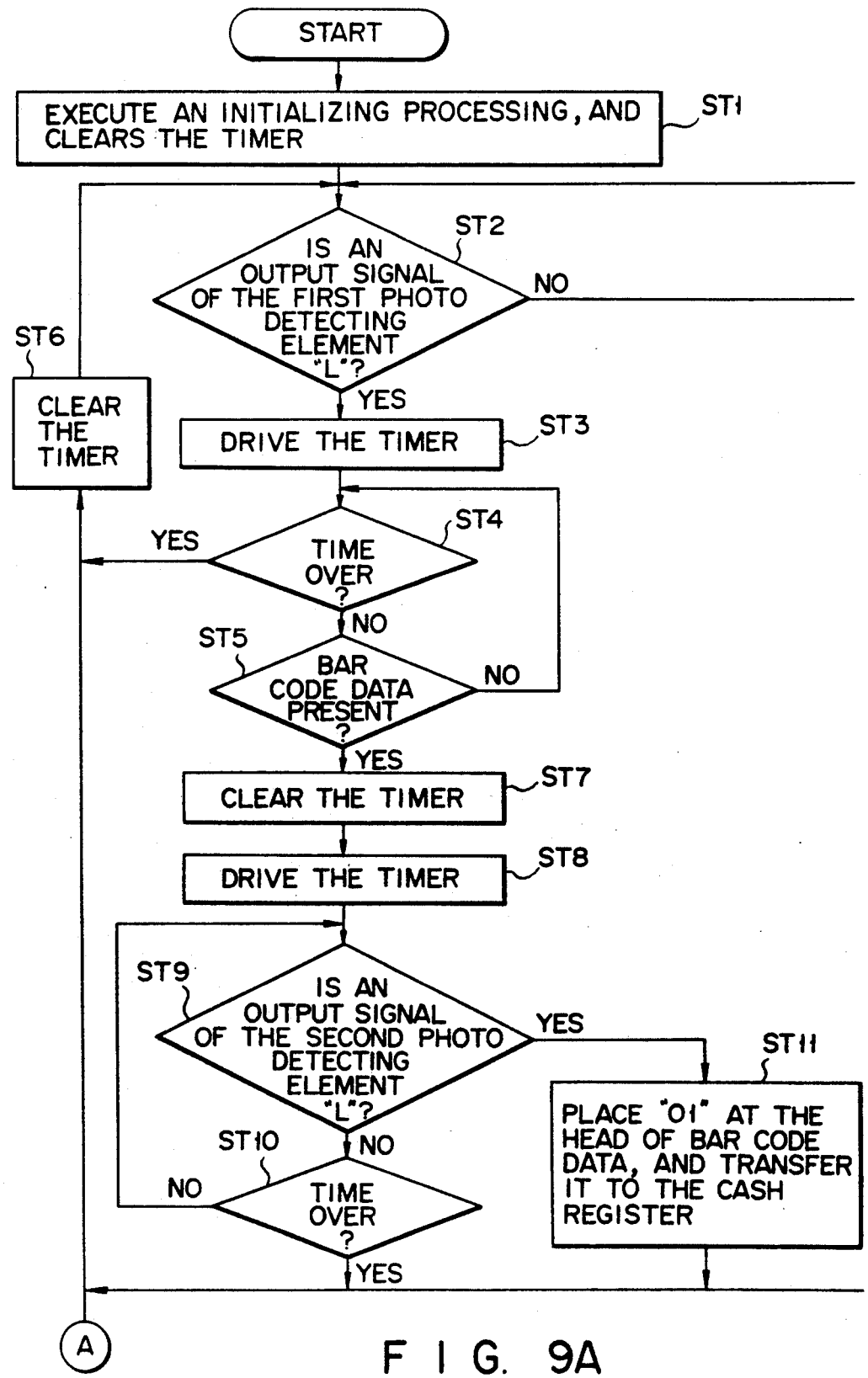
FIGS. 9A, 9B and 10 are flowcharts for explaining operations performed by a settlement system according to a second embodiment of the present invention, which embodiment is similar to the first embodiment.
Figure 9B:
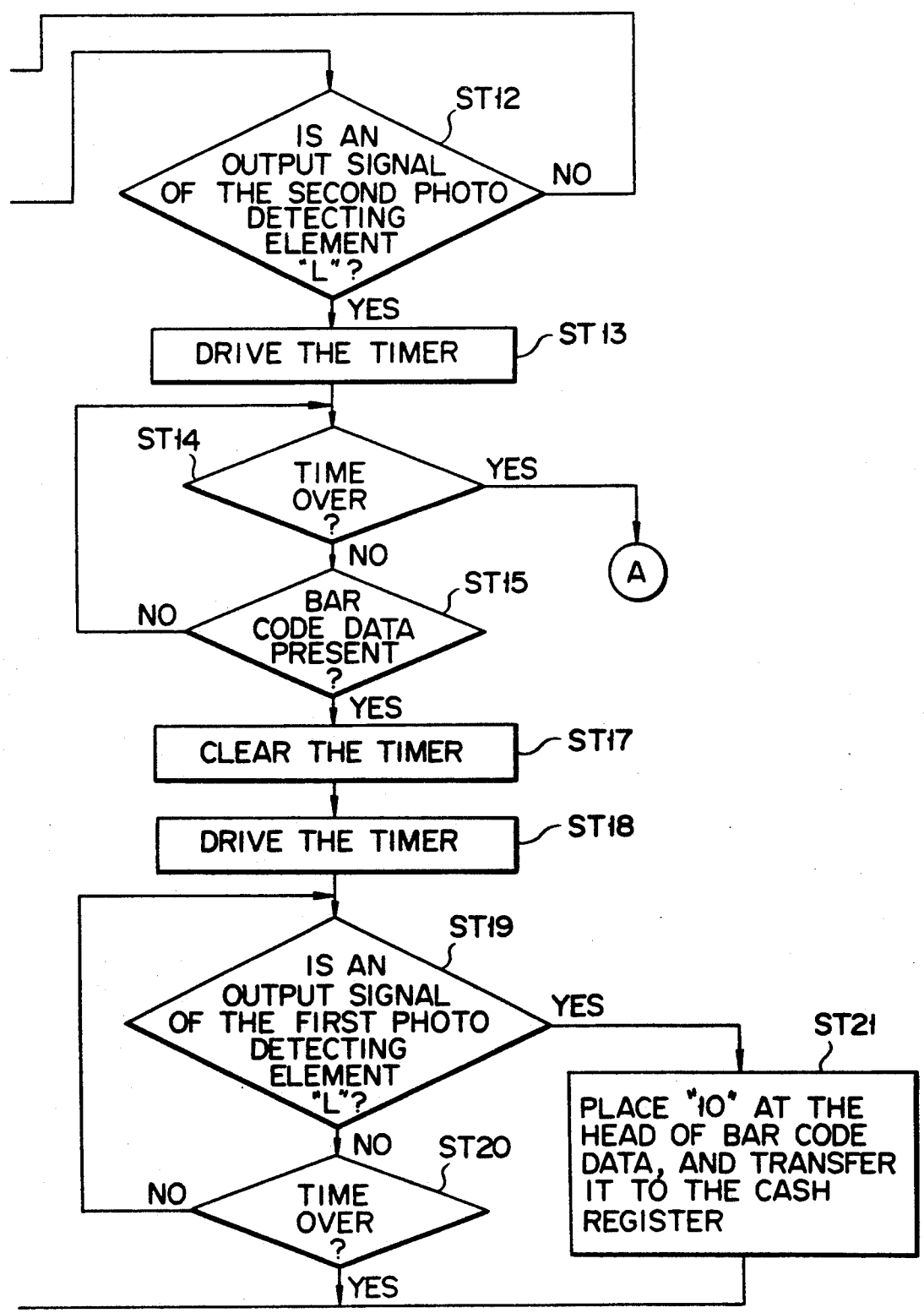
Figure 10:
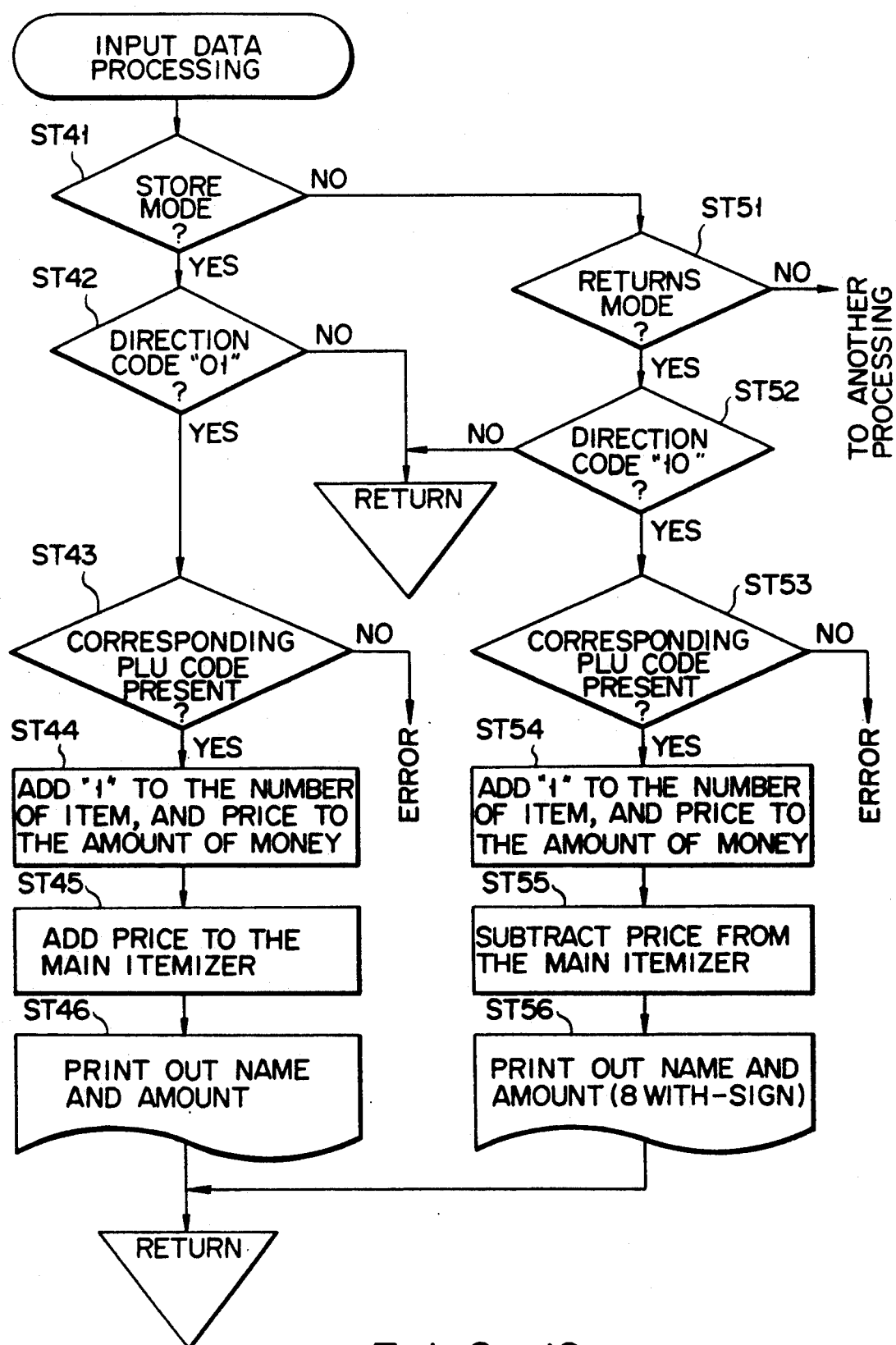

With reference to FIGS. 9A, 9B and 10, a second embodiment of a settlement system according to the present invention will now be described. The instant system is similar to the settlement system of the first embodiment except the following points.

The scanner 11 comprises the ROM 23 which stores a control program for checking which of the sensors 13 and 14 detects the passage of an article before the reader 34 reads the bar code, determining the direction of the article movement on the basis of the check result, attaching a code indicative of the moving direction to the bar code data derived from the reader 34, and transferring the bar code data with the direction code to the cash register 15. The cash register 15 comprises the ROM 43 which stores a control program for checking the direction code attached to the bar code data transferred from the scanner 11, registering the bar code data when the direction code indicates a predetermined moving direction of an article, and canceling the bar code data when the direction code indicates the direction reverse to the former.

The scanner 11 performs a bar code read processing shown in FIGS. 9A and 9B. The step ST11 and ST21 are respectively executed when an article is moved in the direction of arrow A and arrow B (FIG. 2) at a higher than a preset speed. In step ST11, a direction code "01" is placed on the top of the bar code data generated from the CCD sensor 33, and transferred to the cash register 15. In step ST21, a direction code "10" is placed on the to of the bar code data generated from the CCD sensor 33, and transferred to the cash register 15.

When the bar code read operation is started, the timer 31 is cleared in the initial process of step ST1. Thereafter, when the output signal of the first photo detecting element 13B is not "L", the CPU goes to step ST12. In this step, the CPU checks if the output signal of the second photo detecting element 14B is "L".

In a case where the article has passed across the second sensor 14 before the it passes across the first sensor 13, the timer 31 is started in step ST13. The timer 31 is checked in step ST14 to confirm that the preset time has not been elapsed. When it is confirmed, it is checked if the bar code data generated from the CCD sensor 33 is present. If it is absent, the steps ST14 and ST15 are executed again. If it is detected in step ST14 that the preset time has elapsed, the timer 31 is cleared in step ST6, and then step ST2 is executed again. Therefore, it is determined that the sensor 33 failed to read the bar code within the preset time after the article has passed across the second sensor 14.

If the sensor 33 reads a bar code within a preset time, the timer 31 is cleared in step ST17, and started in step ST18. In step ST19, it is checked if the output signal of the first photo detecting element 13B is "L", that is, the article has passed across the first sensor 13. When no article has passed across the sensor 13 yet, the timer 31 is checked in step ST20 to confirm that the preset time has not elapsed Steps ST19 and ST20 are repeated until the preset time has elapsed. After the preset time has elapsed, the timer 31 is cleared in step ST6, and the step ST2 is executed again. Therefore, after an article has passed across the second sensor 14, and the CCD sensor 33 has read bar code data on the article, if the article does not yet pass the first sensor 13 within a preset time, the CPU returns to step ST2.

When the article passes the first sensor 13 within the preset time, the CPU goes to step ST21, and places the direction code "10" at the head of bar code data as read by the sensor 33. Thus, when the CCD sensor 33 produces bar code data within a preset time after the article passed the second sensor 14, and within another preset time as counted from that time point, the article passes the first sensor 13, the code "10" is placed at the head of the bar code data. In other words, when the article is moved at a speed higher than a preset one in the direction of arrow B (FIG. 2), the bar code data with the code "10" is transferred to the cash register 15.

The cash register 15 executes the scanner input data processing in step S35 in FIG. 7, in accordance with a control flow shown in FIG. 10. In step ST41, if a registration mode has been set up by a key operation, step ST42 is executed to check if the direction code affixed to the bar code data from the scanner 11 is "01". If the answer is NO, the CPU 41 returns to step ST32 (FIG. 7). If the answer is YES, the sales data processings of steps ST43 to ST46 are executed. This implies that only when the direction code is "01", that is, the moving direction of the article is the direction of arrow A (FIG. 2), the bar code data is registered.

In step ST41, if the registration mode is not yet set up, step ST51 is executed to check if the present mode is a returns mode. If the answer is NO, the CPU goes to a step of another processing. If the answer is YES, step ST52 is executed to check if the direction code of the bar code data is "10". If it is not "10", that is, the answer is NO, the CPU returns to step ST32 (FIG. 7). If it is "10", viz., the answer is YES, the returns processings of steps ST53 to ST56 are executed. In the returns processings, "1" is subtracted from the number of items of the corresponding PLU code, and the price is subtracted from the amount of money. Succeedingly, the CPU goes to step ST55 where it subtracts the price from the contents of the main itemizer 44B. Finally, it drives the printer 20 to print out the name of article, and the amount of money (with - sign), and returns to step ST32

(FIG. 7). Although not shown, the price is added to the contents of the returns totalizer 44C. Accordingly, when the returns mode is set up, the returns processing is performed after the CPU confirms that the direction code affixed to the bar code data obtained when the article is moved in the direction of arrow B (FIG. 2) is "10".

In the second embodiment thus far described, the scanner 11 checks the moving direction of an article, and attaches the direction code "01" or "10" to the bar code data as read by the reader 34, and then transfers the bar code data with the direction code to the cash register 15. The cash register 15 decides that only the bar code data with the direction code "01" is valid in the registration mode, and prepares the sales data. The same decides that only the bar code data with the direction code "10" is valid in the returns mode, and executes the returns processing.

Therefore, as in the first embodiment, when the sensor fails to read a bar code of an article and to read the bar code again, the article is returned to the original position, it is prevented that the bar code data will be mistakenly registrated two times. Further, when the returns mode is set up, the returns processing may be performed by moving the article in the direction reverse to a predetermined direction. Thus, if additional bar code is mistakenly registrated, that bar code data can be deleted simply and quickly.

In the embodiment as mentioned above, two sensors 13 and 14 are disposed on both sides of the read window 12. To determine the moving direction of an article, which sensor, the sensor 13 or 14 detects the passage of an article before the reader 34 reads the bar code, is checked. Alternatively, either of those sensors, for example, the sensor 14, may be omitted. In this case, the article moving direction is checked on the basis of a relationship between a time point where the sensor 13 detects an article and a time point where the reader 34 reads a bar code.

Figure 11:
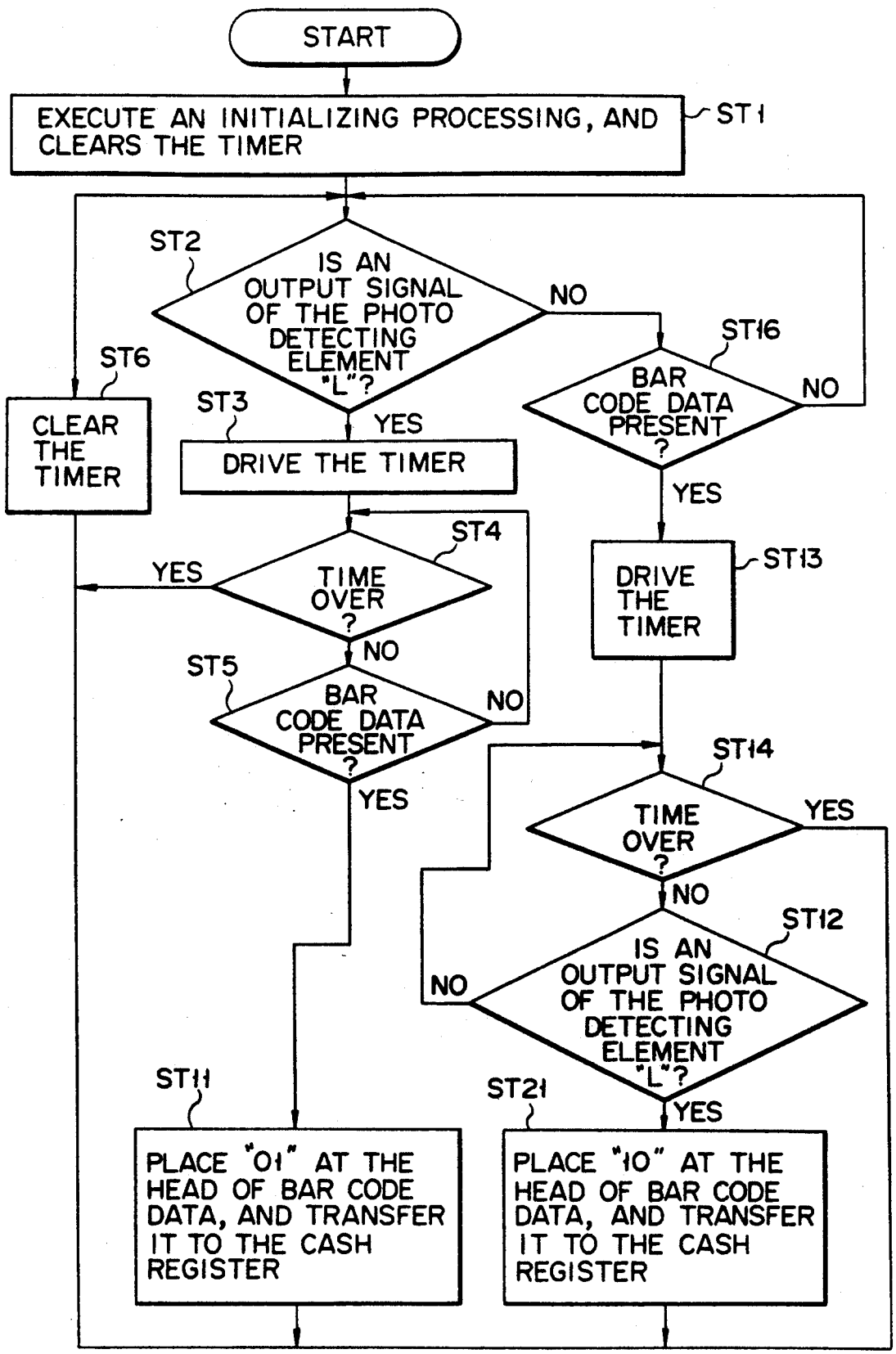
FIG. 11 is a modification of the flowcharts of FIGS. 9A and 9B.

A flow chart shown in FIG. 11 shows a control flow of such an alternative. As shown, in steps ST2 and ST16, the CPU checks which is earlier, outputting of an "L" signal by the photo detecting element 13B or outputting of bar code data by the CCD sensor 33. If the photo detecting element 13B first produces an "L" signal, the CPU considers that the article moved in the direction of arrow A (FIG. 2), and goes to steps ST2 to ST6, and to step ST11 where it places the direction code "01" at the head of the bar code data, and then transfers the bar code data with the code "01" to the cash register 15. Conversely, when the CCD sensor 33 first produces bar code data, the CPU decides that the article moved in the direction of arrow B (FIG. 2), and goes through steps ST13, 14 and 12, to step ST21 where it places the direction code "10" to the head of the bar code data, and transfers it to the cash register 15.

The instance of FIG. 11 is a modification of the second embodiment in which the codes representative of different moving directions of an article are attached to the bar code data as read in the directions, and the bar code data with the direction codes are transferred to the cash register 15. If required, it may be applied to the first embodiment. In this case, the steps ST16, ST12 to ST14, and ST21 are omitted. When the answer is NO in step ST2, control is returned to step ST2. In step ST11, the direction code "01" is not attached to the bar code data.

It is evident that the electronic cash register 15 is applied to a POS terminal for preparing sales data, but is may be applied to any other suitable devices.

What is claimed is:

1. A data reading device comprising:
   a read window having at least a first edge portion and a second edge portion;
   read means for optically reading a symbol formed on an article passing across a limited space in front of said read window, said read means generating a data signal whenever the read means reads the symbol;
   sensing means for sensing the presence of the article at the first edge portion of said read window, said sensing means generating a detection signal when the article is sensed by said sensing means; and
   processing means including means for checking an order of the data signal and the detection signal generated respectively by said reading means and sensing means, to detect a direction of movement of the article between the first and second edge portions of said read window; and
   means for invalidating a data signal generated by said read means responsive to detection of said movement of said article being in a direction from said second edge portion of said first edge portion.

2. A data reading device according to claim 1, wherein said processing means further comprises:
   delay sensing means for detecting that one of said data signal and said detection signal is not generated within a predetermined period of time after the other of said data signal and detection signal has been generated; and
   said delay sensing means enabling said processing means to ignore the other of said data signal and detection signal responsive to said detecting by said delay sensing means.

3. A data reading device according to claim 2, wherein said sensing means comprises an optical sensor located at an edge portion of said read window.

4. A data reading device according to claim 1, wherein said processing means further comprises:
   transfer means for transferring the data signal from said reading means; and
   said transfer means attaching a direction code to the data signal being transferred, said direction code indicating a moving direction of the article corresponding to the checked order of the signal generated by said reading means and sensing means.

5. A data reading device according to claim 4, wherein said processing means further comprises:
   cancelling means for cancelling the data signal from said transfer means, in response to the direction code attached to said data signal indicating that the moving direction of the article is from said second edge portion to said read window to said first edge portion of said read window.

6. A data reading device according to claim 5, wherein said read window, said read means, and said transfer means comprises a bar code scanner.

7. A data reading device according to claim 6, further comprising:
   a cash register;
   said cancelling means being incorporated in the cash register; and
   said cash register being spaced apart from said bar code scanner.

8. A data reading device according to claim 7, wherein said cancelling means includes accumulating processing means for processing the data signal transferred by said transfer means and for accumulating a result of the processing.

9. A data reading device comprising:

a read window having at least a first edge portion and a second edge portion;

read means for optically reading a symbol formed on an article passing across a limited space in front of said read window, said read means generating a data signal whenever the read means reads the symbol;

first sensing means for sensing a presence of the article at the first edge portion of said read window and generating a first detection signal when the article is sensed at said first edge portion;

second sensing means for sensing a presence of the article at the second edge portion of said read window and generating a second detection signal when the article is sensed at said second edge portion; and processing means including means for checking an order of the detection signals generated by said first and second sensing means, to detect a direction of movement of the article between the first and second edge portions of the read window; and means for invalidating a data signal generated by said read means responsive to detection of said movement of the article being in a direction from said second edge portion to the first edge portion.

10. a data reading device according to claim 9, wherein said processing means further comprises:

delay sensing means for detecting that one of said first and second direction signals is not generated within a predetermined period of time after the other of said first and second detection signals has been generated; and said delay sensing means enabling said processing means to ignore the other of said first and second detection signals responsive to said detecting by said delay sensing means.

11. A data reading device according to claim 10, wherein said first and second sensing means comprise optical sensors respectively located at said first and said second edge portions of said read window.

12. A data reading device according to claim 9, wherein said processing means further comprises:

transfer means for transferring the data signal from said reading means; and said transfer means attaching a direction code to said data signal being transferred, said direction code indicating a moving direction of the article corresponding to the checked order of the first and second detection signals generated by said first and second sensing means.

13. A data reading device according to claim 12, wherein said processing means further comprises:

cancelling means for cancelling the data signal from said transfer means, in response to the direction code attached to said data signal indicating that the moving direction of the article is from said second edge portion of said read window to said first edge portion of said read window.

14. A data reading device according to claim 13, wherein said read window, said read means, and said transfer means comprise a bar code scanner.

15. A data reading device according to claim 14, further comprising:

a cash register;

said cancelling means being incorporated in the cash register; and said cash register being spaced apart from said bar code scanner.

16. A data reading device according to claim 15, wherein:

said cancelling means includes accumulating processing means for processing the data signal transferred by said transfer means and for accumulating a result of the processing.

* * * * *